(12) United States Patent
McDaniel et al.

(10) Patent No.: US 11,223,061 B2
(45) Date of Patent: Jan. 11, 2022

(54) PROCESS FOR PRODUCING ELECTRICAL POWER FROM A MULTIPHASIC BATTERY SYSTEM

(71) Applicant: PHILLIPS 66 COMPANY, Houston, TX (US)

(72) Inventors: Neal McDaniel, Ochelata, OK (US); Hongjin Tan, Bartlesville, OK (US); James Anthony Suttil, Bartlesville, OK (US); Sharmila Samaroo, Bartlesville, OK (US); Jeffrey H. Drese, Owasso, OK (US); Reed J. Eisenhart, Bartlesville, OK (US)

(73) Assignee: PHILLIPS 66 COMPANY, Houston, TX (US)

( * ) Notice: Subject to any disclaimer, the term of this patent is extended or adjusted under 35 U.S.C. 154(b) by 64 days.

(21) Appl. No.: 16/578,144

(22) Filed: Sep. 20, 2019

(65) Prior Publication Data

US 2020/0099082 A1 Mar. 26, 2020

Related U.S. Application Data

(60) Provisional application No. 62/734,327, filed on Sep. 21, 2018, provisional application No. 62/734,317, filed on Sep. 21, 2018.

(51) Int. Cl.
*H01M 8/18* (2006.01)
*H01M 6/14* (2006.01)
(Continued)

(52) U.S. Cl.
CPC ............. *H01M 8/188* (2013.01); *H01M 6/14* (2013.01); *H01M 8/08* (2013.01); *H01M 8/20* (2013.01); *H02J 7/00* (2013.01)

(58) Field of Classification Search
CPC ...................................................... H01M 8/188
(Continued)

(56) References Cited

U.S. PATENT DOCUMENTS

| 2014/0057140 A1* | 2/2014 | Bendert | H01M 8/04447 429/51 |
| 2014/0255812 A1* | 9/2014 | Fischel | H01M 8/04291 429/451 |

(Continued)

OTHER PUBLICATIONS

Musbaudeen O. Bamgbopa, Saif Almheiri, Hong Sun, "Prospects of recently Developed Membraneless Cell Designs for Redox Flow Batteries", Renewable and Sustainable Energy Reviews 70, 2017, pp. 506-518.

(Continued)

*Primary Examiner* — James M Erwin
(74) *Attorney, Agent, or Firm* — Phillips 66 Company

(57) ABSTRACT

A redox flow battery is described that does not include ion-exchange resin such as an expensive proton exchange membrane but rather uses immiscible catholyte and anolyte liquids in contact at a liquid-liquid interface. Solvents and electrochemically active components of the anolyte and catholyte would not cross the liquid-liquid interface between the anolyte and catholyte, but certain ions in each of the anolyte and catholyte would cross the interface during charging and discharging of the redox flow battery. Suitable chemical options are described along with system options for utilizing immiscible phases.

14 Claims, 10 Drawing Sheets

(51) Int. Cl.
 *H01M 8/20* (2006.01)
 *H02J 7/00* (2006.01)
 *H01M 8/08* (2016.01)

(58) Field of Classification Search
 USPC .......................................................... 429/51
 See application file for complete search history.

(56) References Cited

U.S. PATENT DOCUMENTS

| | | | | |
|---|---|---|---|---|
| 2014/0370403 | A1* | 12/2014 | Narayan ............... | H01M 8/188 |
| | | | | 429/418 |
| 2015/0050570 | A1* | 2/2015 | Keshavarz ............ | H01M 8/188 |
| | | | | 429/409 |
| 2019/0296383 | A1* | 9/2019 | Cushman .............. | H01M 4/905 |

OTHER PUBLICATIONS

Musbaudeen O. Bamgbopa, Yang Shao-Horn, Raed Hashaikeh, Saif Almheiri, "Cyclable Membraneless Redox Flow Batteries Based on Immiscible Liquid Electrolytes: Demonstration With All-Iron Redox Chemistry", Electrochimica Acta 267, 2018, pp. 41-50.

Paula Navalpotro, Jesus Palma, Marc Anderson, and Rebeca Marcilla, "A Membrane-Free Redox Flow Battery with Two Immiscible Redox Electrolytes", Angewandte Chemie, Wiley Online Library, 2017, 129, pp. 12634-12639.

* cited by examiner

PROCESS FOR PRODUCING ELECTRICAL POWER FROM A MULTIPHASIC BATTERY SYSTEM

CROSS-REFERENCE TO RELATED APPLICATIONS

This application is a non-provisional application which claims benefit under 35 USC § 119(e) to U.S. Provisional Application Ser. No. 62/734,317 filed Sep. 21, 2018, entitled "IMMISCIBLE LIQUID SEPARATED BATTERY SYSTEM," and to U.S. Provisional Application Ser. No. 62/734,327 filed Sep. 21, 2018, entitled "MULTIPHASIC BATTERY SYSTEM," both of which are incorporated herein in their entireties.

STATEMENT REGARDING FEDERALLY SPONSORED RESEARCH OR DEVELOPMENT

None.

FIELD OF THE INVENTION

This invention relates to flow battery systems or liquid electrolyte battery systems.

BACKGROUND OF THE INVENTION

Flow batteries store electrical energy in a chemical form using liquid electrolytes and dispense the stored energy in an electrical form via a spontaneous reverse redox reaction of the electrolytes. A flow battery is an electrochemical storage device in which an electrolyte containing one or more dissolved electrochemically active species flows through a reactor cell where chemical energy is converted to electrical energy. The flow battery may be recharged by reversing the electric flow and restoring the potential chemical energy back in to the electrolytes.

The electrolytes used in flow batteries are generally composed of ionized metal salts that are stored in large external tanks and are pumped through each side of the cell according to the charge/discharge current applied. Externally stored electrolytes is directed t flow through the battery system by pumping, gravity feed, or by any other method of moving fluid through the system. One advantage of flow batteries is that they can be almost instantly recharged by replacing the electrolyte liquid, while simultaneously recovering the spent material for re-energization outside the flow battery. Another is that the capacity of the flow battery for energy storage, which is determined by the volume of the electrolyte storage tanks, is independent of that for power production, determined by the number and size of the power cells. This allows flow batteries to be sized in accordance with their intended stationary energy storage application and avoids wasteful oversizing of one aspect of the battery to meet specification on another aspect, as is often the case with more conventional, non-flow battery designs. For instance, a flow battery may easily be sized to meet the energy needs of a known load, such as back up lighting or grid balancing, for a period of time where the power cell is designed to provide the power needed and the tanks holding the anolyte and catholyte are sized to provide the power cell with the energy need for the time dictated, whether it be for several hours or several weeks. For a higher power need, such as for grid peaking plant support, the power cells are larger and/or more numerous for higher power supply and then the tanks are sized to provide the larger power cell with the energy need for the decided duration. Different classes of flow batteries have been developed, including redox and hybrid. The fundamental difference between conventional batteries and flow cells is that energy is stored as the electrode material in conventional batteries but as the electrolyte in flow cells.

Since the electrolyte is stored externally to the power cell, the amount of energy that can be stored by a flow battery is determined by the solubility of the electrolytes within their solvent system, the potential difference between the electrolytes, and the volume of the tanks. The volume of the tanks and storage capacity can be easily scaled. In one example, to increase the energy capacity, the tank volume can be increased by 100 percent using ready-made storage tanks at an estimated cost increase of only 50 percent compared to a new system. However, the problem with flow batteries are that the highly specialized ion-selective membrane materials which separate the two half-cells are performance-limiting, short-lived, and expensive.

There exists a demand for a reliable and affordable flow battery.

BRIEF SUMMARY OF THE DISCLOSURE

The present embodiment relates to a process for delivering electrical power from a redox flow battery to an electrical circuit that includes an electric load, wherein the process includes selecting both a catholyte and an anolyte that each have electrochemical activity and an ion-forming supporting electrolyte wherein the catholyte and anolyte are substantially immiscible one to the other. The power cell is filled with the catholyte and anolyte to immiscibly coexist within the power cell and be immiscible at a liquid-liquid interface but allow certain ions to move relatively freely back and forth across the liquid-liquid interface. The anolyte is directed from an anolyte storage tank to the power cell where the anolyte is disposed within the power cell while a generally corresponding volume of the anolyte in the power cell is directed out of the power cell while the catholyte is directed from a catholyte storage tank to the power cell where the catholyte is disposed within the power cell while a generally corresponding volume of the catholyte in the power cell is directed out of the power cell. Electrical power is produced by the oxidation of the electrochemical constituent of the anolyte and the reduction of the electrochemical constituent of the catholyte while electrons flow from the anolyte through the electrical circuit and the certain ions move from the anolyte to catholyte across the liquid-liquid interface. It should be noted that there is no ion exchange resin such as a proton exchange membrane within the redox flow battery separating the anolyte and catholyte.

BRIEF DESCRIPTION OF THE DRAWINGS

A more complete understanding of the present invention and benefits thereof may be acquired by referring to the following descriptions taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
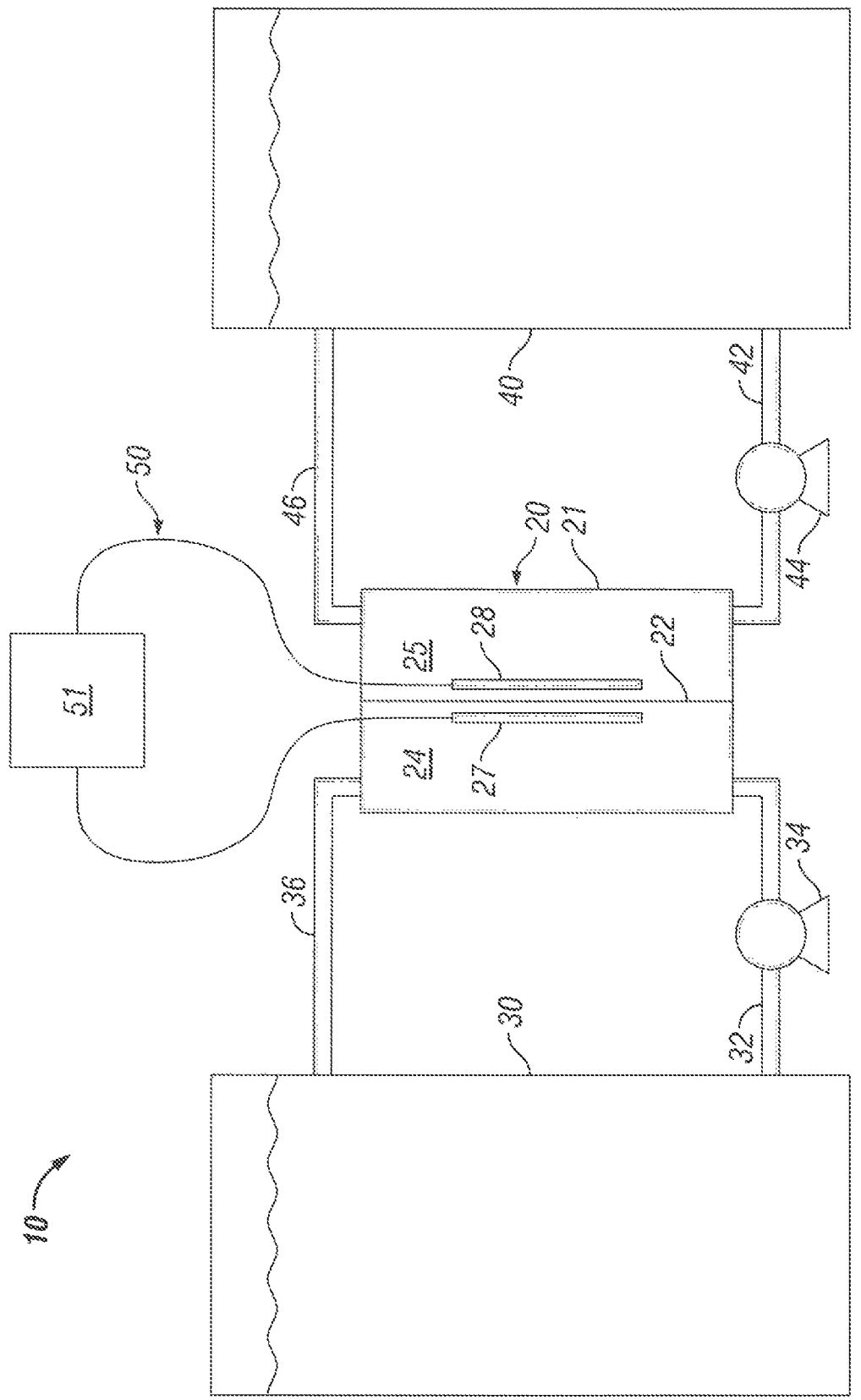
FIG. 1 is a diagram of a basic, prior art flow battery.

Turning to FIG. 1, a conventional redox flow battery is indicated by the arrow 10 with a power cell 20 at the center. The power cell 20 includes a housing 21 with an ion-selective membrane 22 dividing the housing into two compartments 24 and 25. The liquid anolyte is on the left side of the housing 21 in anolyte compartment 24 and the liquid catholyte is on the right side of the housing 21 in catholyte compartment 25. Preferably, each of the compartments 24 and 25 are substantially filled with the respective liquid electrolyte. The anolyte compartment 24 contains liquid anolyte that is continually refreshed from anolyte tank 30 via an anolyte supply conduit 32 and an anolyte circulation pump 34. Anolyte is returned from the housing 21 to the anolyte tank 30 via anolyte return line 36. Similarly, the catholyte side of the housing is supplied with liquid catholyte from catholyte tank 40 via catholyte supply conduit 42 and catholyte circulation pump 44 and the catholyte is returned to tank 40 via catholyte return line 46. Power cell 20 further includes anolyte electrode 27 and catholyte electrode 28 that are each spaced from the ion membrane, but in contact with their respective electrolyte liquids. The electrodes 27 and 28 serve as electrical contacts for the flow battery 10 to be in electrical connection with a circuit 50 that includes an electric load 51. While the anolyte and catholyte are shown to circulate in a complete circuit, in some circumstances, the flow is from a storage tank through the power cell and then into a discharge tank for later recharging. Both arrangements are suitable for the present invention.

In focusing on the present invention, current materials for the membrane 22 tends to be very expensive and not sufficiently robust for providing long term service. The focus of the present invention is to eliminate the membrane by using selected electrolytes that are immiscible with one another forming a stable liquid-liquid interface. Immiscibility may be accomplished by polar and nonpolar electrolytes, by density differences and by other formulation differences in the electrolytes.

Figure 2:
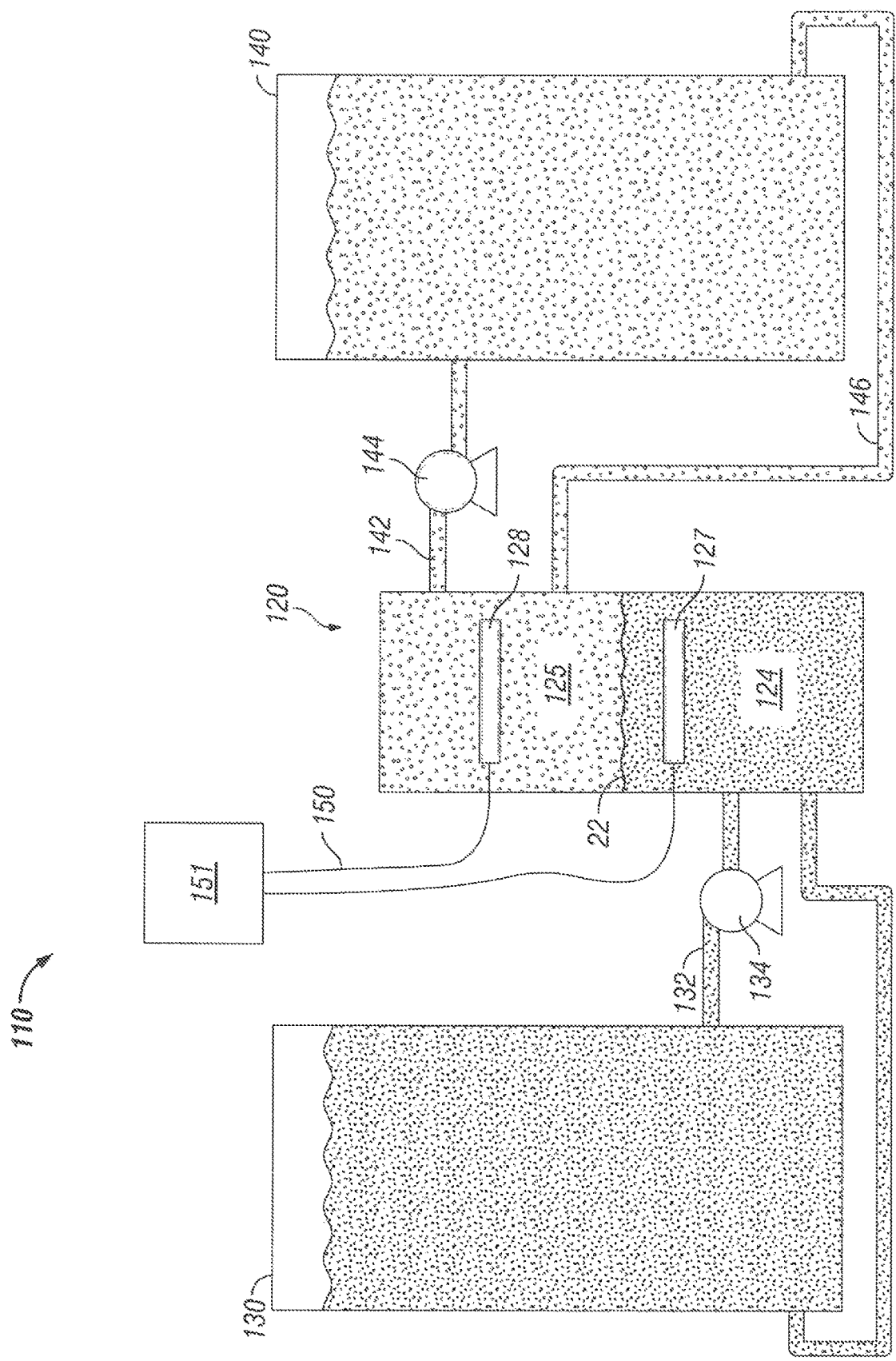
FIG. 2 is a diagram of a first embodiment of the invention for a ion exchange membrane-free flow battery.

FIG. 2 shows an inventive flow battery 110 where all components that have equivalent components in FIG. 1 retain similar reference numbers such that an element in FIG. 2 has the same reference number with an added "100". For example, the flow battery in FIG. 1 is indicated by arrow 10 and the flow battery in FIG. 2 has the reference arrow 110. In the inventive system, the power cell 120 is arranged to have one electrolyte 124 disposed at the lower portion of the cell 120 while the second electrolyte 125 is arranged to be disposed on top of the one electrolyte 124 where they are only separated by a liquid interface 122 that forms by density differences. The phobic chemical nature and surface tension keep the two electrolytes from coalescing or dissolving into one another. There is no physical barrier between the two electrolytes other than the naturally forming interface created by formulation of the two electrolytes. As in the description of the flow battery 10 in FIG. 1, tanks 130 and 140 contain larger volumes of electrolytes which are pumped through the power cell 120 while electrodes 127 and 128 are connected to a power system 151 where electric power is discharged from the flow battery 110 or electric power is delivered into the flow battery 110 for recharging.

In this arrangement shown in FIG. 2, the one electrolyte 124 is at least 0.1 g/cc denser than the other electrolyte 125. Preferably, the density difference is at least 0.1 g/mL but preferably higher up to a practical maximum of about 1.5 to 2.0 g/mL.

Figure 3:
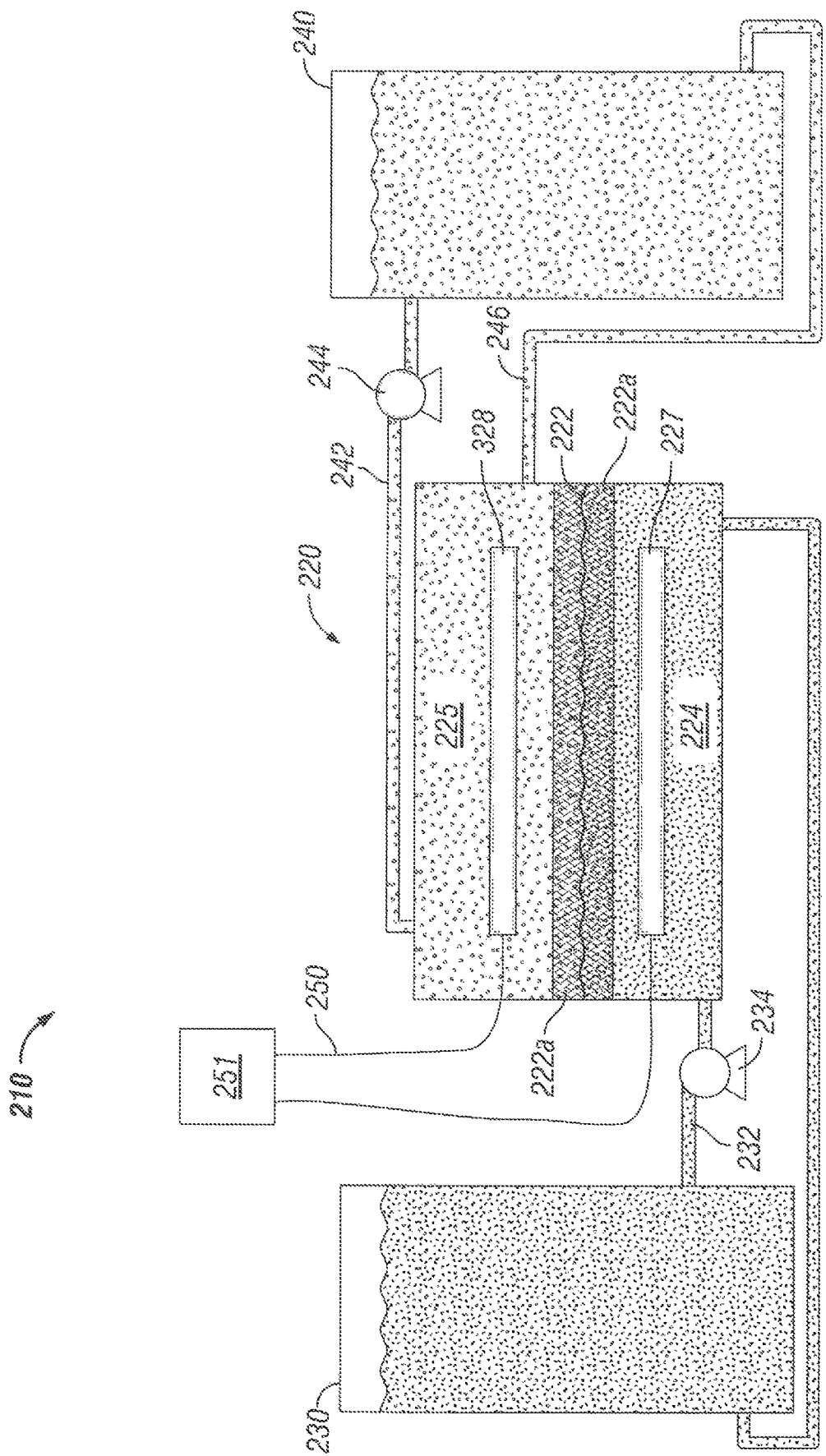
FIG. 3 is a second embodiment for a membrane-free flow battery.

FIG. 3 shows a second embodiment of the invention, again where elements in FIG. 3 have corollary elements to FIG. 1 adding 200 or in FIG. 2 adding 100. In FIG. 3, the liquid-liquid interface 222 is arranged at either an upper or lower surface of a porous liquid flow buffering device 322a where the liquid flow buffering device 322a is essentially filled with either the anolyte or catholyte, but not both. The porous liquid flow buffering device 322a provides resistance to turbulence in the electrolytes so as not to stir one electrolyte into the other. The preference and affinity of the buffering device 322a for one of the electrolytes over the other, due to capillary forces within the pores of the buffering device, also provides protection against bulk flow of either liquid through the device; in this way, the vertical position of the liquid-liquid interface is more easily controlled during operation of the battery. The flow battery functions by keeping the anolyte physically and chemically separated from the catholyte, allowing ions to move from one electrolyte to the other and moving electrons through the power system 251. When anolyte and catholyte are physically mixed, the electrochemically active components react to effectively discharge the flow battery 210 to some extent, while generating waste heat.

Suitable materials for the porous liquid flow buffering device 222a include three dimensional gauzes, wire meshes, expanded open cell foams, polymer meshes and similar open cell systems that principally serve to resist higher velocity liquid flow and dampen liquid eddy currents or other liquid turbulence that may disrupt the integrity of the liquid-liquid interface. The porous liquid flow buffering device is static, non-reactive, and has a thickness that may vary from about 0.001 cm up to 0.5 cm. As noted above, two distinct high surface area or porous solids may be used together that are each suited for one electrolyte or the other for a respective thickness of preferably between about 0.0005 and about 0.25 cm on either side of the liquid-liquid interface 222 but a thicker porous liquid flow buffering device having a thickness of 1 cm up to maybe 5 or 10 cm may be used. When two buffering devices are used in close proximity to the liquid-liquid interface or where the liquid-liquid interface would be anticipated once the liquids fill the power cell, the lower electrolyte fills and occupies the void or pore space of the lower buffering device and then the upper electrolyte is added to fill and occupy the void or pore space of the upper buffering device on that side of the power cell. The buffering devices may be selected to be phillic to one liquid and therefore phobic to the opposite liquid, but it may simply turn out that the buffering device becomes phobic to the opposite liquid simply due to liquid capillary action within the adjacent buffering devices. As such, the respective phillic and phobic natures of the liquids forming the liquid-liquid interface along with the capillary action of the buffering devices creates conditions for a very stable liquid-liquid interface. The thickness of these buffering devices is typically not very thick; they may optionally be as thick as 2 to 3 inches, but more typically are from 0.25 mm thick up to about 5 to 10 mm thick in practice. It is preferred that the adjacent two buffering devices are in very close proximity maybe even flush together, but may also be spaced apart up to a few millimeters.

In a preferred embodiment, the liquid-liquid interface 222 is not upset by turbulence of anolyte and catholyte, as the interface is protected by the porous liquid flow buffering devices that surround it.

In an ideal, nonrealistic situation, the buffering device 222a would be prepared from a material that equally favors both electrolytes equally. In this situation, the liquid-liquid interface 222 would be capable of residing within the buffering device 222a itself, which has the advantage of fully protecting the interface 222 from turbulence on either side of the flow battery cell 210. However, even in such an idealized circumstance, controlling the vertical position of the liquid-liquid interface 222 would be very difficult to accomplish. The more realistic scenario is that one of electrolyte would fill the entire buffering device 222a, such that the liquid-liquid interface 222 is situated at one of the surfaces (upper or lower) of the buffering device 222a.

Figure 4:
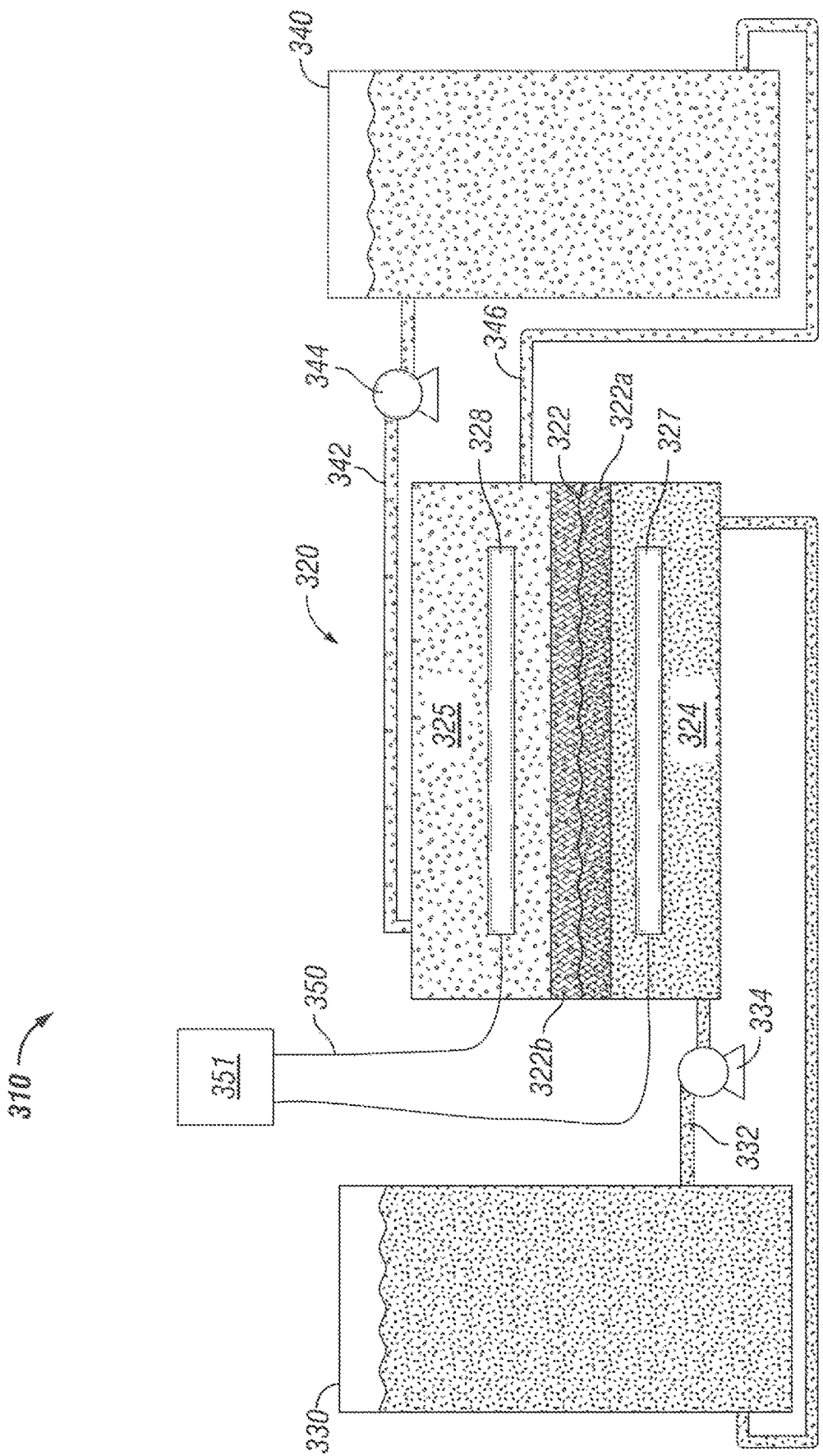
FIG. 4 is a third embodiment for a membrane-free flow battery.

A preferred approach, shown in FIG. 4, is to enlist two separate materials as lower buffering device, 322a and upper buffering device 322b, with upper buffering device 322a exhibiting a strong preference for upper electrolyte 325, and lower buffering device 322b exhibiting a strong preference for lower electrolyte 324. Then, arranging the two materials 322a and 322b face-to-face in order to produce a composite buffering device, the vertical position of the liquid-liquid interface 322 is naturally held in position at the center of the buffering device, between 322a and 322b.

Figure 5:
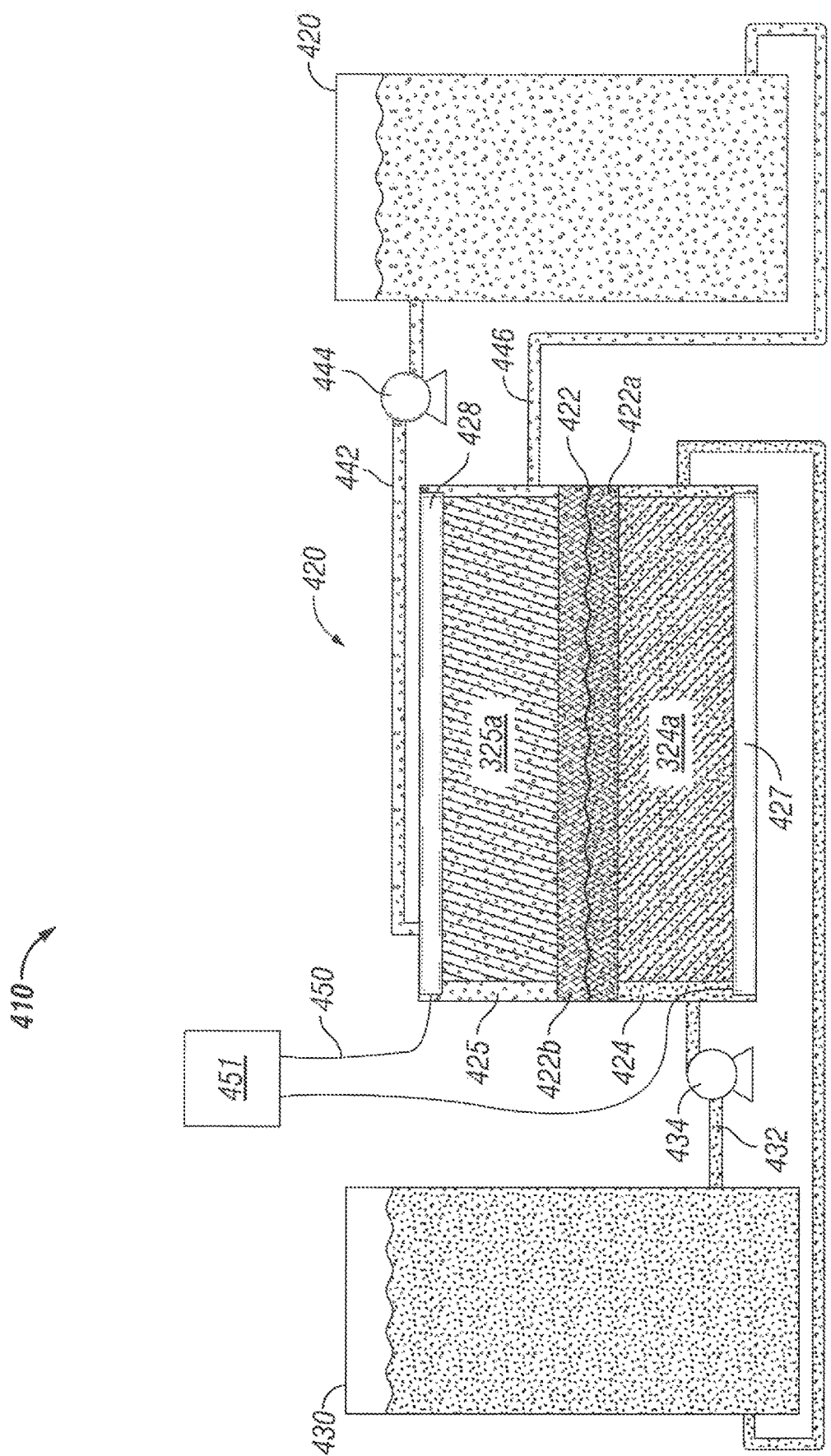
FIG. 5 is a fourth embodiment for a membrane-free flow battery.

In yet a further alternative embodiment of the present invention shown in FIG. 5, the power cell is further provided with a pair of high surface area or porous, electrically conductive materials where one is an anolyte conductive material 424a and the other is a catholyte conductive material 425a such as graphitic carbon through which the respective electrolyte will flow, whether by random pores or ordered flow channels in the graphite, to better facilitate the charge transfer of electrons between the liquid electrolytes and their respective electrodes, and then through the power system 451. Again, for simplicity of explanation, similar or common elements from one embodiment to the next use similar reference numbers. So, in this fourth embodiment, the electrolytes flow easily through the respective porous liquid flow buffering device and respective porous, electrically conductive material such that the electrochemically active portions of each respective electrolyte remain within its respective half-cell while ions of the supporting electrolyte are able to pass through the liquid-liquid interface 422.

As mentioned earlier, the electrolytes are formulated to be immiscible in one another, but these liquids comprise multiple materials to serve several functions. First, each electrolyte is formed of basically three constituents. The first constituent is an electrochemically active material, typically comprising a metal ion. These electrochemically active materials are most commonly in solid form. As such, the second constituent is typically a solvent that is suited to dissolve the electrochemically active material, preferably with a high concentration of electrochemically active material. In the present invention without an actual membrane to separate the two electrolytes, the solvents are selected to be relatively phobic to one another. Moreover, the solvent is required to solvate selectively (to the maximum extent possible or practical) the electrochemically active materials in all accessible oxidation states, such that they are contained within the respective half-cell. However, as oxidative and reductive reactions occur during recharge and discharge, ions need to pass through the liquid-liquid interface. As such, the liquid-liquid interface is ideally a semipermeable interface in that it is permeable to specific ions, added for this purpose. Toward these ions the liquid-liquid interface is permeable, but the interface is preferably impermeable to the electrochemically active ions that populate each respective half-cell. As such, each electrolyte, in addition to electrochemically active materials and solvent also include a supporting electrolyte that forms the amphiphilic ions, which transit between the two electrolytes. Immiscibility of the electrolytes may come from the selection of these three components or may be achieved by adding other components to create phobicity toward the other.

In one embodiment, the electrolytes are different based on their underlying solvents being independently selected from aqueous brine, or other non-aqueous solvents such as alkyl sulfoxides, alkyl sulfones, cyanoalkanes, nitroalkanes, amides, ethers, ketones, pyrrolidones, alcohols, and alkyl carbonates. More specific examples of the solvent materials include dimethylsulfoxide, ethyl methyl sulfone, sulfolane, acetonitrile, nitromethane, nitroethane, dimethylformamide, dimethoxyethane, 3-pentanone, 2-butanone, N-methylpyrrolidone, tert-butyl alcohol, ethylene carbonate, dimethylcarbonate, and propylene carbonate. In other embodiments, it is possible that the liquid phases do not contain any halogenated carbonaceous species.

The selection of an aqueous brine to serve as the solvent within one of the two electrolytes permits the selection of some otherwise water-miscible organic solvents within the opposing electrolyte, while nevertheless maintaining phase-stable, generally immiscible electrolyte layers. For example, it is known in unrelated art that an aqueous brine consisting of 1 to 2 mole/L potassium chloride is immiscible with the organic solvent acetonitrile, whereas pure water is fully miscible with acetonitrile. And each of these solvents may be used on either side of the flow battery. Numerous similar arrangements are possible and can be utilized to beneficial effect, such as improved conductivity, electrical efficiency, and density differential, within the present invention. When aqueous brine is used as the solvent, the aqueous brine would contain water, cations, and anions. Examples of such cations can include: $Li^+$, $Na^+$, $K^+$, $Rb^+$, $Mg^{2+}$, $Ca^{2+}$, $Sr^{2+}$, $Ba^{2+}$, $NH_4^+$, $N(CH_3)_4^+$, $N(C_2H_5)_4^+$, $N(C_3H_7)_4^+$, $N(C_4H_9)_4^+$, pyridiniums, imidazoliums, pyrrazoliums, other quaternary ammoniums and heterocyclic cations. Examples of such anions can include: $F^-$, $Cl^-$, $NO_3^-$, $SO_4^{2-}$, $PO_4^{3-}$, $HPO_4^{2-}$, $H_2PO_4^-$, $CO_3^{2-}$, $CN^-$, $BF_4^-$, $PF_6^-$, $B(Ph)_4^-$, $ClO_4^-$, methanesulfonate, trifluoromethanesulfonate, p-toluenesulfonate, halogenated alkyl-sulfonates, non-halogenated alkyl-sulfonates, acetate, trifluoroacetate, trichloroacetate, halogenated alkyl-carboxylates, non-halogenated carboxylates, citrate, phenolate, phenolate dertivates, benzenediolate, benzenediolate derivatives, benzenetriolate, benzenetetrolate derivatives, benzenepentolate, benzenepentolate derivatives, benzenehexolate, and benzenehexolate derivatives.

Turning back to the constituents of the electrolytes, each electrolyte contains an electrochemically active material such as transition metal complexes formed from transition metal ions and ligands. Examples of ligands include organic and inorganic molecules which adhere to a metal ion with monodentate, bidentate, tridentate, tetradentate, pentadentate, or hexadentate binding groups comprising amines, imines, carboxylates, nitriles, alkoxides, amides, sulfides, phosphines, arsenines, halides, ethers, dienes, or conjugated alkoxides. The transition metal ions can consist of common oxidation states of titanium, vanadium, chromium, manganese, iron, cobalt, nickel, copper, lead, tin, sulfur, cerium, molybdenum, tungsten, iodine, bismuth, and mercury. The transition metal ions are most preferably selected from common oxidation states of chromium, manganese, iron, cobalt, nickel, and copper. While not necessary for the invention, it is expected that most arrangements of the invention will comprise electrochemically active materials that do not cross the liquid-liquid interface.

In an alternative arrangement of a flow battery according to the present invention, one or both of the electrochemically active materials can be purely organic materials containing no metal ions or only alkali earth metal ions. Examples include, but are not limited to, viologens, catechols, benzoquinones, naphthoquinones, anthraquinones, other quinones, carbazoles, imides, organosulfur compounds, triphenyl amines, pyridines, pyridiniums, and cyclopropenium materials, and innumerous substituted versions of these chemical structures.

In yet another arrangement of a flow battery of the present invention, the anolyte electrochemically active material and the catholyte electrochemically active material are kinetically stable against the formation of insoluble solid phases under standard battery operating conditions. Preferred battery operating conditions can reasonably be defined as pH ranging from 3 to 11, temperature ranging from 0° C. to 40° C., currents ranging from 1 to 100 mA/cm$^2$, and absolute voltages ranging from −0.5 to +1 volts vs. the standard hydrogen electrode (SHE).

The demulsifiability or the inclination of the anolyte and catholyte to separate from one another should they get stirred together is dependent upon the formulations of the anolyte and catholyte. In one arrangement, demulsifiability is attained when one of the electrolytes has a density that is at least 0.1 g/cc greater than the other electrolyte. It is theorized that the 0.1 g/cc density variance of the two liquid phases would be sufficient to maintain a planar, semipermeable liquid-liquid interface without causing emulsion. It is also possible that the density variance might be less than 0.1 g/cc, with phase placement maintained instead by capillary forces within a porous physical separator such as a buffering device or pair of buffering devices as described above. Greater density variance would increase the inclination of the anolyte and catholyte to vertically separate for an even more stable liquid-liquid interface.

In a further arrangement, a demulsifier can be added to either or both electrolytes to create phobicity between the electrolytes. The selection and quantity of the demulsifier can be chosen to ensure the planar, semipermeable liquid-liquid interface is maintained. Examples of demulsifiers can include: highly nonpolar solvents such as nonpolar hydrocarbons (paraffins or aromatics), halocarbons (e.g. chlorocarbons such as dichloromethane, chloroform, or carbon tetrachloride), or nonpolar esters (e.g. isopropyl acetate or tert-butyl acetate); short-chained alcohols such as ethanol or isopropanol; hard-ion based salts such as sodium sulfate, sodium carbonate, or potassium chloride; or strongly hydrophobic or hydrophilic, soluble polymers such as polyamines, polyethyleneimines, polyols, or phenolic resins.

Additional requirements of the respective electrolytes are that they both have a conductivity of at least 1 S cm$^2$/mol, but it is preferred that the conductivity be higher such as around 5 to 20 and more typically about 8 or 10 S·cm$^2$/mol to about 15 S cm$^2$/mol. In yet another preferred arrangement for the invention is to select the respective chemistries of the anolyte and catholyte to each have electrochemical stability that extends across a range of at least 2 volts.

In a further alternative embodiment, the electrolytes are both selected to be non-corrosive, allowing the components of the flow battery to be constructed of most any common tank construction material. Corrosive components are typically acids, ionic liquids, and moieties that have metal-coordinating structural attributes or are otherwise metallophillic. Examples of common tank construction materials that may be used if the anolyte and catholyte are non-corrosive include various polyolefin plastics, carbon steel, and stainless steels such as 300 series stainless steels. In other embodiments, more corrosion resistant materials can be employed. These corrosion-resistant materials of construction can include halogenated polymers or polymer-coated steels, and high-nickel metallurgies such as nichrome or the 400, 600, or 800 series alloys. Often, these high corrosion-resistance alloys can be employed as surface-deposited layers, protecting less-expensive, less-resistant alloys such as austenitic steels. It would be desirable that the anolyte and catholyte liquids are each selected to cause less than 10 mils per year corrosivity toward common metallurgies such as carbon steel and stainless steel, as well as toward common hydrocarbon-based polymers such as polyolefins.

In yet another embodiment, the electrodes can be any known electrode capable of conducting electricity so long as they are stable within the corresponding electrolyte. Examples of electrodes include those that contain graphite in various forms, carbon nanotubes, nano-spheres, other structured forms of conductive carbon, as well as conductive polymers. The use of noble-metal coated base metals, such as platinized titanium or gold-plated nickel, is also possible.

When selecting materials for the electrolytes it is possible in one alternative embodiment that the heterogeneous charge transfer rate coefficient is at least 0.1 cm/s.

The redox flow battery according to claim 1 wherein the Kinematic Viscosity of each of the anolyte and catholyte are between 0.005 and 1 cm$^2$/s; more preferably between 0.005 and 0.6 cm$^2$/s; most preferably between 0.01 and 0.11 cm$^2$/s.

It is preferred that a redox flow battery utilize electrolytes that have a Ligand Binding Constant for each of the anolyte and catholyte that are between 0.0001 and 100 UNITS.

It is preferred that a redox flow battery use where the conductivity between the electrolytes is between 1 and 20 S cm$^2$/mol; most preferably between 8 and 15 S cm$^2$/mol.

In one arrangement of the invention, the redox flow battery includes biphasic solvents that each comprise a three-solvent blend consisting of water, acetonitrile, and an organic solvent with dielectric constant less than 25. Conceived examples of such an arrangement includes ternary solvent combinations, e.g. H$_2$O/Acetonitrile/Xylenes, allowing the omission of brines include: 1) 30% water, 70-x % acetonitrile, x % 3-pentanone, where x ranges from 16 to 30%; 2) 30% water, 70-x % acetonitrile, x % t-butyl acetate, where x ranges from 8 to 20%; and 3) 30% water, 70-x % acetonitrile, x % toluene or xylenes or any single-ring aromatic hydrocarbon, where x ranges from 3 to 12%.

It is also part of the present invention for the anolyte and catholyte to have kinematic viscosity between 0.005 and 1 cm$^2$/s; more preferably between 0.005 and 0.6 cm$^2$/s; and most preferably between 0.01 and 0.11 cm$^2$/s.

The anolyte and catholyte should be liquids in a temperature ranging from at least about −5° C. up to about 80° C. The electrochemical stability of the anolyte and catholyte should overlap over a range of at least 2 volts.

EXAMPLES

The following examples of certain embodiments of the invention are given. Each example is provided by way of explanation of the invention, one of many embodiments of the invention, and the following examples should not be read to limit, or define, the scope of the invention.

Example 1

In a first example of the present invention, a functional battery arrangement is demonstrated from a chemical system consisting of an aqueous anolyte comprising a brine solution consisting of 0.4 wt % sodium iron(III) bis(2,6-pyridinedicarboxylate) (Fe(N^N)$_3$) as the electrochemically active material, 2.6 wt % tetrabutylammonium chloride (TBACl) and, 7.3 wt % potassium chloride as supporting electrolytes, and 89.7 wt % water as the solvent. This liquid is denser than the catholyte and would occupy the lower portion of the power cell. The non-aqueous catholyte comprises is an organic solution containing 1.1 wt % iron(II) tris(4,4'-di-tert butyl-2,2'-dipyridyl) hexafluorophosphate as the electrochemically active material, 3.8 wt % tetrabutylammonium hexafluorophosphate (TBACl) as the supporting electrolyte, and 95.1 wt % acetonitrile as the solvent.

The electrolyte and catholyte were added in equal volumetric parts to a cylindrical glass container. A ¾" diameter, ¼" thick carbon felt disc was suspended in each phase by an insulated graphitic rod for each electrode, to make contact with each disc, allowing the current to flow through an external circuit. The headspace of the cylindrical container was purged of molecular oxygen by introducing ~30 sccm of molecular nitrogen flow.

Figure 6:
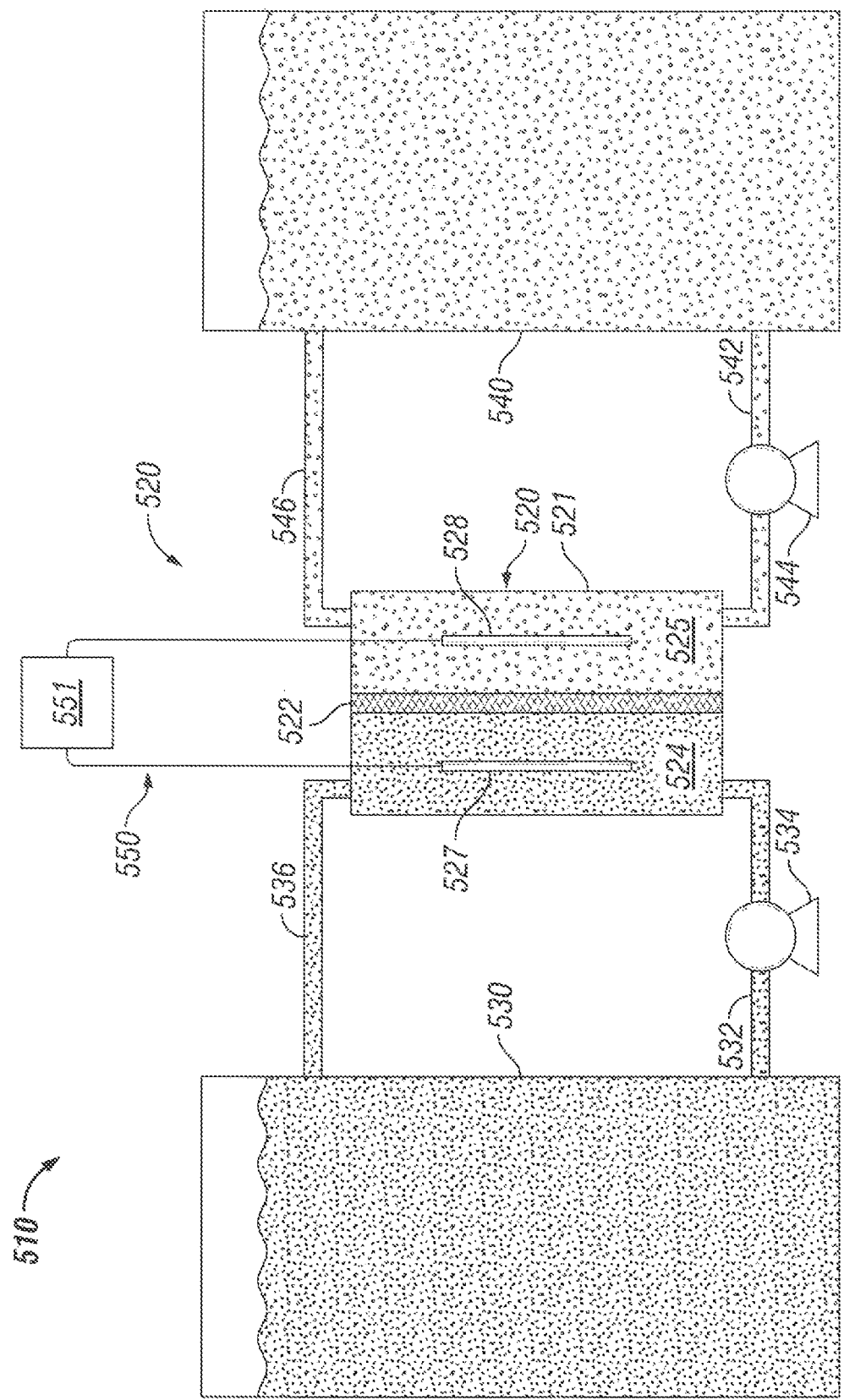
FIG. 6 is fifth embodiment for a membrane-free flow battery.
Figure 7:
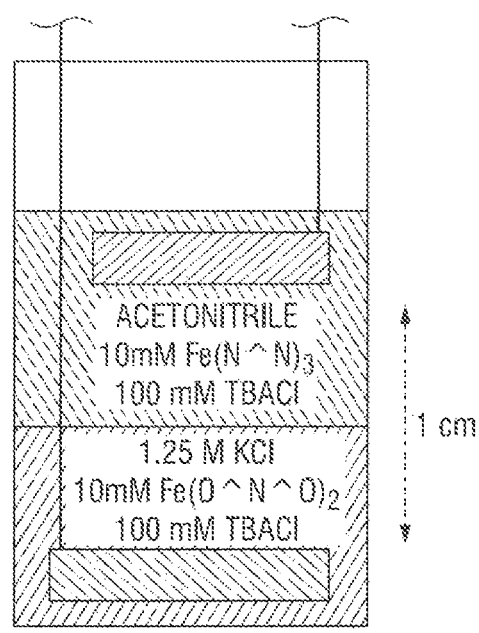
FIG. 7 is a simple visual diagram showing the power cell set up for Example 1.

Galvanostatic cycles were performed on the assembly thus prepared, starting with a charge cycle. The electrochemically active species were found through cyclic voltammetry to exhibit iron(II/III) transitions at 0.19 volts vs. Ag/AgCl (aqueous phase) and 0.92 volts vs. Ag/AgCl (acetonitrile phase). The set up for this Example 1 is shown schematically in FIG. 6 and the galvanic cycles are shown in FIG. 7 where the first two cycles were carried out at ±1 mA and the remainder of the cycles were reset to ±0.5 mA. While charge capacity diminished during cycling of the battery, the invention functioned through a number of cycles.

Example 2

In a second example of the present invention, a functional battery arrangement is demonstrated from a chemical system consisting of an aqueous anolyte comprising a brine solution consisting of 0.4 wt % sodium iron(III) bis(2,6-pyridinedicarboxylate) (Fe(O^N^O)$_2$), 2.9 wt % tetraethylammonium p-toluenesulfonate (TBACl), and 7.3 wt % sodium sulfate (NaSO$_4$) as the supporting electrolytes, and 89.5 wt % water as the solvent. The anolyte is less dense than the catholyte in this example and therefore occupies the upper portion of the power cell. The catholyte is a non-aqueous organic solution containing 1.0 wt % iron(II) tris(4,4'-di-tert butyl-2,2'-dipyridyl) acetate (Fe(N^N)$_3$) as the electrochemically active material, 3.0 wt % tetraethylammonium p-toluenesulfonate (TEAOTs) as the supporting electrolyte, and 96.0 wt % propylene carbonate as the solvent.

Figure 8:
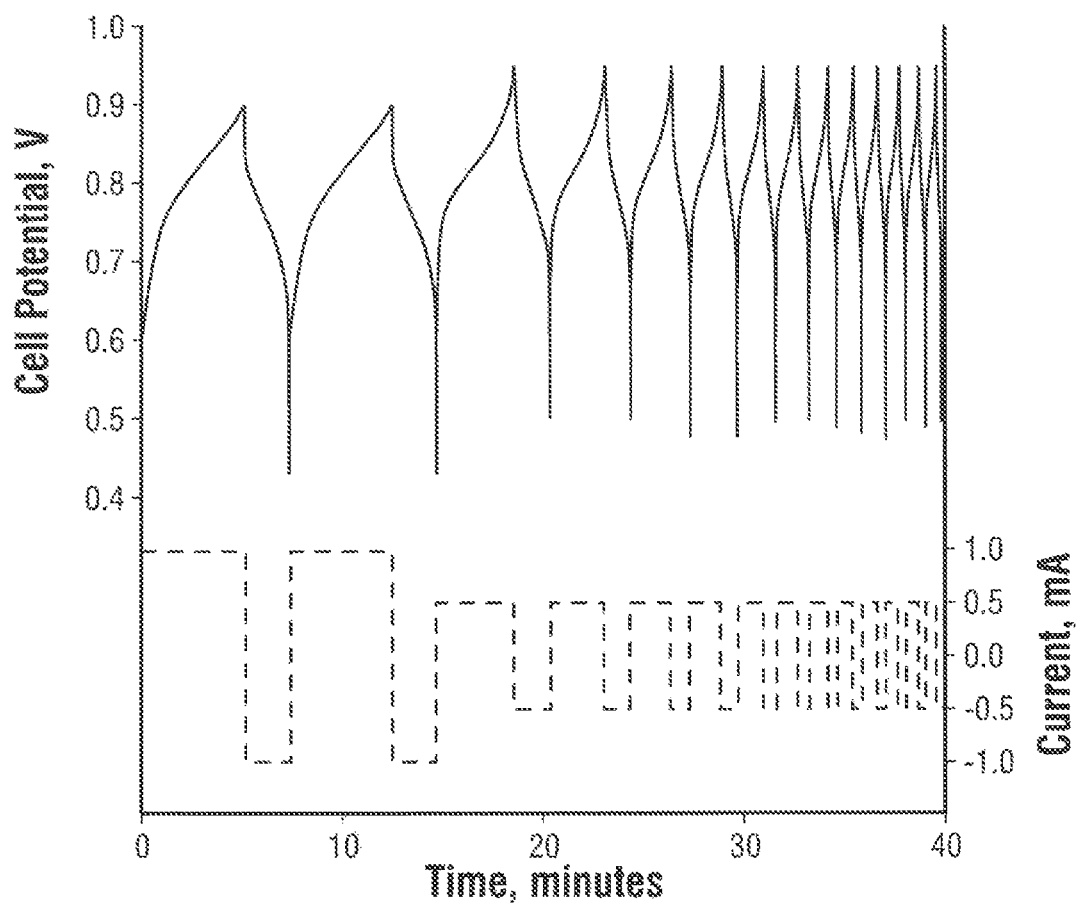
FIG. 8 is a chart showing the charge and discharge curves measured as a result of the set up in Example 1.
Figure 9:
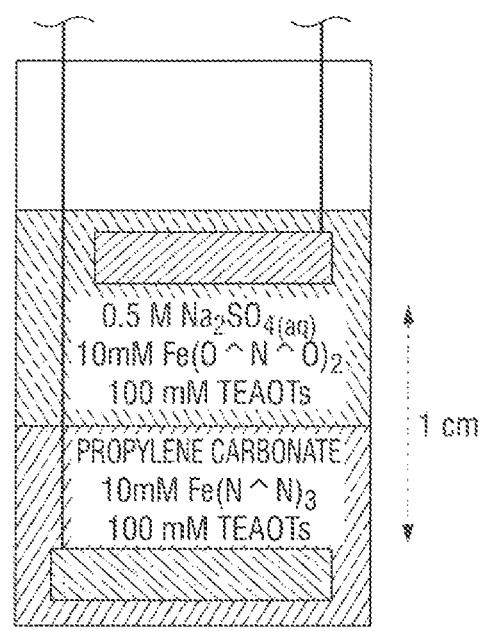
FIG. 9 is a simple visual diagram showing the power cell set up for Example 2.

The anolyte and catholyte were added in equal volumetric parts to a cylindrical glass container, with a ¾" diameter, ¼" thick carbon felt disc suspended in each phase by an insulated graphitic rod that serves as the respective electrode allowing the current to flow through an external circuit. The headspace of the cylindrical container was purged of molecular oxygen by introducing ~30 sccm of molecular nitrogen flow. The measured galvanostatic cycles with ±0.25 mA of applied current on the assembly thus prepared are shown in FIG. 9 based on the schematic arrangement shown in FIG. 8.

Example 3

Figure 10:
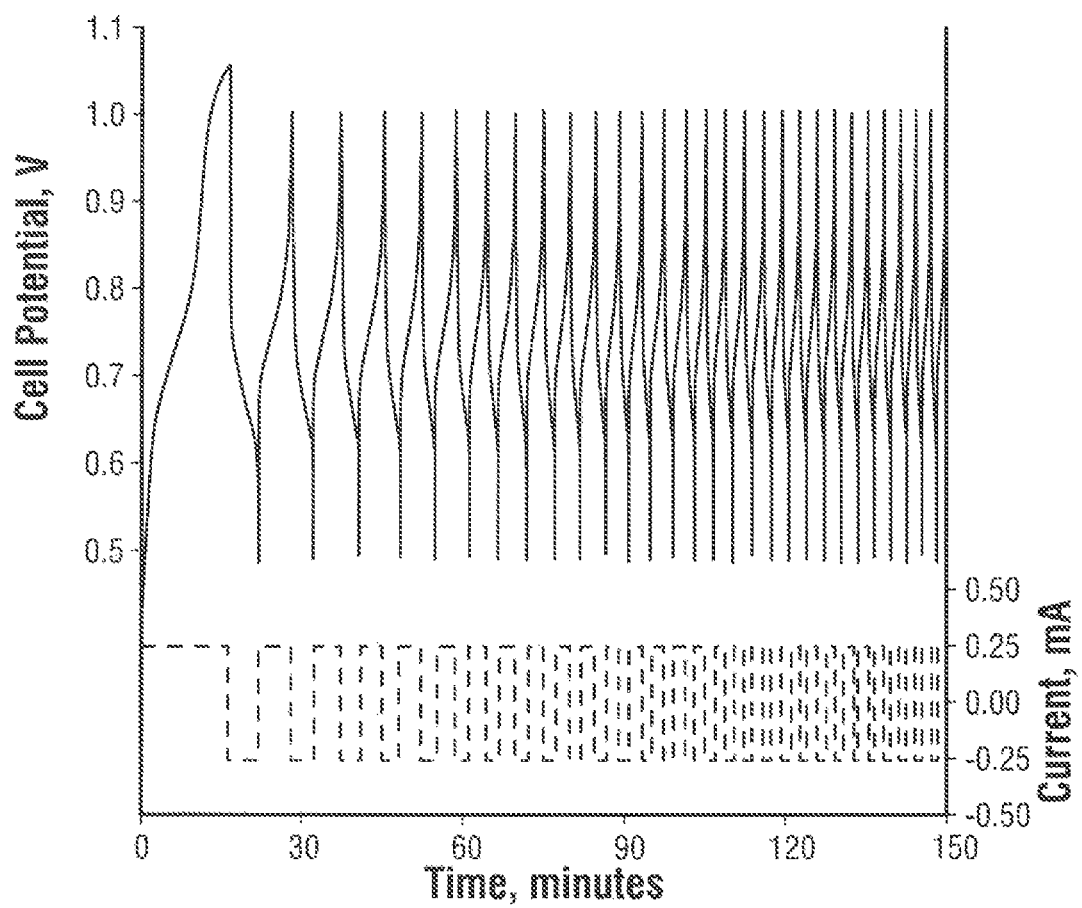
FIG. 10 is a chart showing the charge and discharge curves measured as a result of the set up in Example 2.
Figure 11:
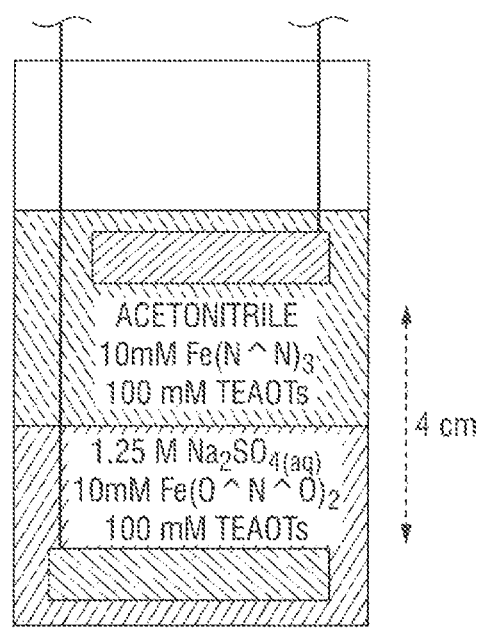
FIG. 11 is a simple visual diagram showing the power cell set up for Example 3.

A third example of a functional battery according to the present invention is demonstrated from a chemical system consisting of an aqueous anolyte comprising a brine solution consisting of 0.4 wt % sodium iron(III) bis(2,6-pyridinedicarboxylate) (Fe(O^N^O)$_2$) as the electrochemically active material, 2.9 wt % tetraethylammonium p-toluenesulfonate (TEAOTs) and 7.3 wt % sodium sulfate as the supporting electrolytes, and 89.5 wt % water as the solvent. In this example, the anolyte is denser than the catholyte and therefore occupies the lower portion of the power cell. The catholyte is an organic solution containing 1.0 wt % iron(II) tris(4,4'-di-tert butyl-2,2'-dipyridyl) acetate (Fe(N^N)$_3$) as the electrochemically active material, 3.0 wt % tetraethylammonium p-toluenesulfonate as the supporting electrolyte, and 96.0 wt % acetonitrile. The anolyte and catholyte were added in equal volumetric parts to a cylindrical glass container, with a ¾" diameter, ¼" thick carbon felt disc suspended in each phase by an insulated graphitic rod to serves as the electrodes, allowing the current to flow through an external circuit. The headspace of the cylindrical container was purged of molecular oxygen by introducing ~30 sccm of molecular nitrogen flow. The setup is shown diagrammatically in FIG. 10, and the resulting galvanostatic cycles with ±0.75 mA of applied current are shown in FIG. 11.

Example 4

In a final example, energy storage is demonstrated from a chemical system consisting of horizontally configured aqueous anolyte and organic catholyte, each containing a vitreous graphite foam electrode. The horizontal configuration is accomplished using an H-cell with a physical separator comprising porous polytetrafluoroethylene (PTFE), sealed by a PTFE O-ring which serves as a thin (0.05 cm) buffering device. The anolyte consists of 0.1 wt % sodium iron(III) bis(2,6-pyridinedicarboxylate), 3.0 wt % tetraethylammonium p-toluenesulfonate, and 96.9 wt % water. The catholyte consists of 0.1 wt % iron(II) tris(4,4'-di-tert butyl-2,2'-dipyridyl) acetate, 3.0 wt % tetraethylammonium p-toluenesulfonate, and 96.9 wt % propylene carbonate.

The electrolytes were added in equal volumetric parts to either compartment of an electrochemical H-cell, with a 1×½×½" vitreous carbon prism suspended in each phase by a platinum wire, as the electrodes to make contact with each disc, allowing the current to flow through an external circuit.

Figure 12:
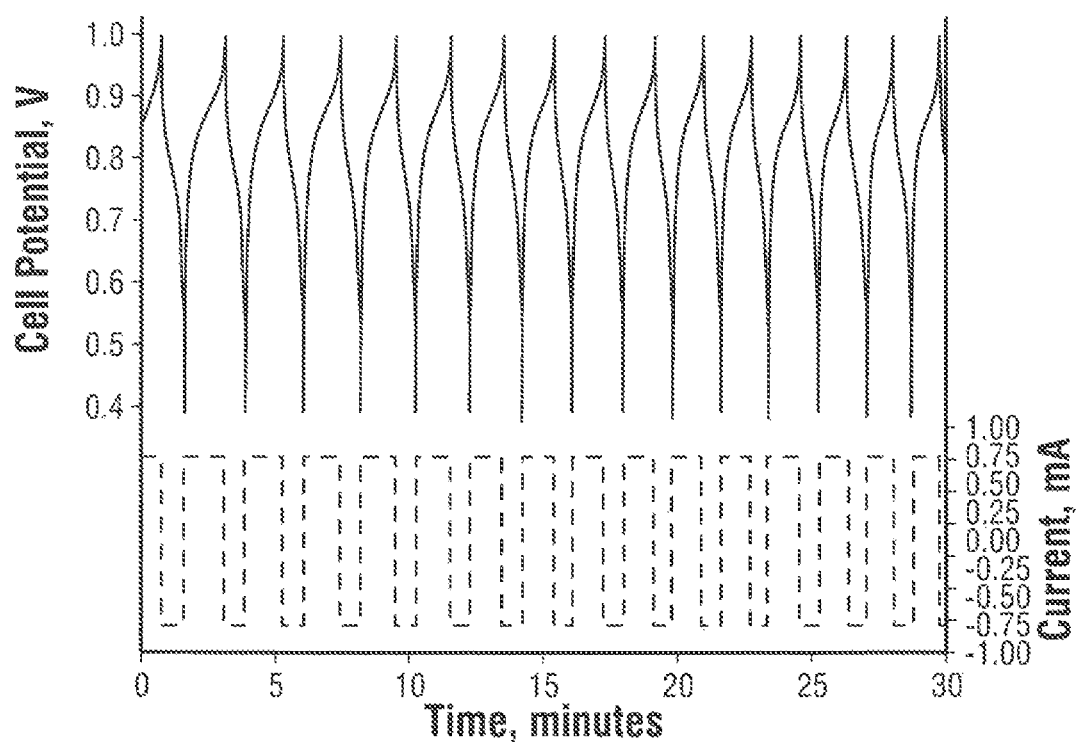
FIG. 12 is a chart showing the charge and discharge curves measured for Example 3.
Figure 13:
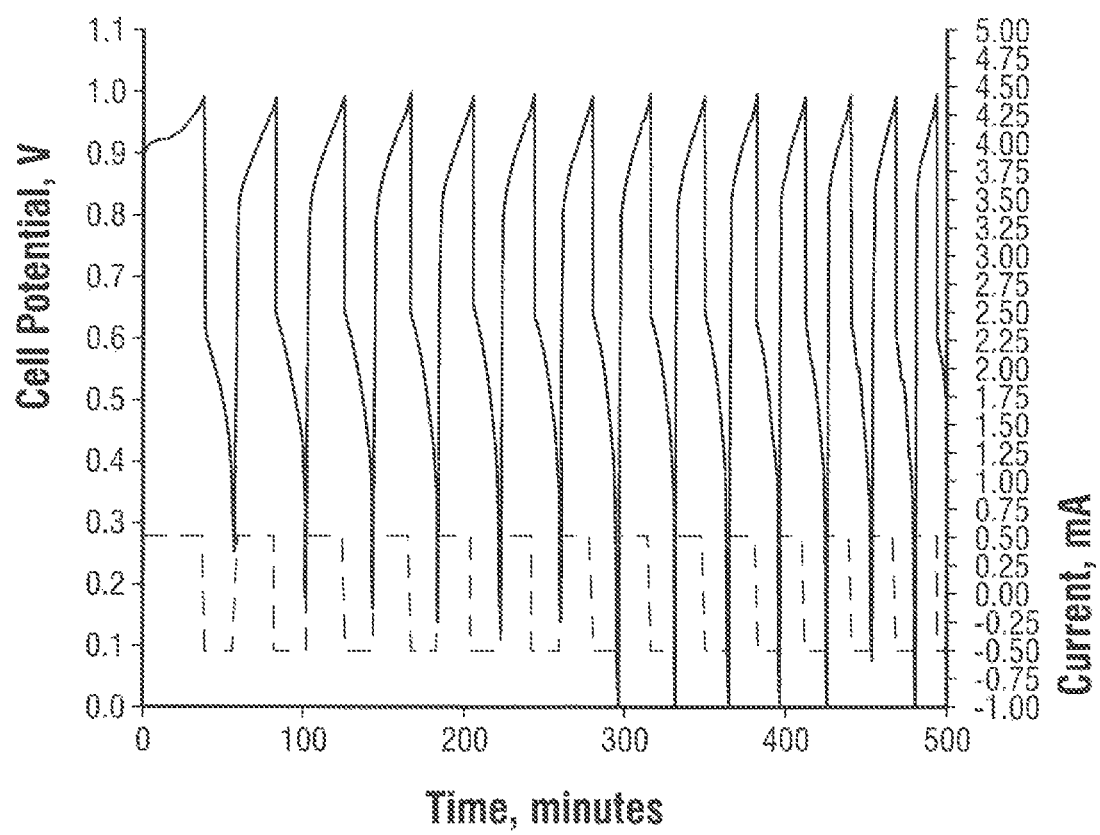
FIG. 13 is a chart showing the charge and discharge curves measured for Example 4.

The headspace of the H-cell was purged of molecular oxygen by introducing ~30 sccm of molecular nitrogen flow. The measured galvanostatic cycles with ±0.25 mA of applied current on the assembly thus prepared are shown in FIG. 12, starting with a charge cycle. A reference electrode was added to each compartment, to individually measure the absolute potential of each electrode. The aqueous half-cell began the experiment at double the iron concentration as the organic half-cell, and hence was the cause of overall cell polarization.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for delivering electrical power from a redox flow battery to an electrical circuit that includes an electric load, wherein the process comprises:
    selecting both a catholyte and an anolyte that each have electrochemical activity and an ion-forming supporting electrolyte wherein the catholyte and anolyte are immiscible one to the other;
    filling a power cell with the catholyte and anolyte to immiscibly coexist within the power cell and be immiscible at a liquid-liquid interface but allow certain ions to move freely back and forth across the liquid-liquid interface;
    directing anolyte from an anolyte storage tank to the power cell where the anolyte is disposed within the power cell while a corresponding volume of the anolyte in the power cell is directed out of the power cell;
    directing catholyte from a catholyte storage tank to the power cell where the catholyte is disposed within the power cell while a corresponding volume of the catholyte in the power cell is directed out of the power cell; and
    producing electrical power by the oxidation of the electrochemical constituent of the anolyte and the reduction of the electrochemical constituent of the catholyte while electrons flow from the anolyte through the electrical circuit and the certain ions move from the anolyte to catholyte across the liquid-liquid interface and there is no ion exchange resin within the redox flow battery separating the anolyte and catholyte,
    wherein the step of selecting the anolyte and catholyte further includes selecting the anolyte and catholyte to have ligand binding constant between ligands and metals to be between $10^{10}$ and $10^{40}$.

2. The process according to claim 1, wherein the step of selecting the anolyte and catholyte further includes selecting the anolyte and catholyte to have a conductivity to be at least 1 S·cm$^2$/mol.

3. The process according to claim 1, wherein the step of selecting the anolyte and catholyte further includes selecting the anolyte and catholyte to be chemically immiscible and are selected from the group consisting of: aqueous brine, alkyl sulfoxides, alkyl sulfones, cyanoalkanes, nitroalkanes, amides, ethers, ketones, pyrrolidones, alcohols, and alkyl carbonates.

4. The process according to claim 3, wherein the step of selecting the anolyte and catholyte further includes selecting one of the anolyte and catholyte to be an aqueous brine comprising water, and at least 0.5 moles/liter ionic strength of electrochemically inactive cations and anions.

5. The process according to claim 4, wherein the step of selecting the cations further comprises selecting the cations from the group consisting of: $Li^+$, $Na^+$, $K^+$, $Rb^+$, $Mg^{2+}$, $Ca^{2+}$, $Sr^{2+}$, $Ba^{2+}$, $NH_4^+$, $N(CH_3)_4^+$, $N(C_2H_5)_4^+$, $N(C_3H_7)_4^+$, $N(C_4H_9)_4^+$, pyridiniums, imidazoliums, pyrrazoliums, other quaternary ammoniums and heterocyclic cations.

6. The process according to claim 4, wherein the step of selecting the anions further comprises selecting the anions from the group consisting of: $F^-$, $Cl^-$, $NO_3^-$, $SO_4^{2-}$, $PO_4^{3-}$, $HPO_4^{2-}$, $H_2PO_4^-$, $CO_3^{2-}$, $CN^-$, $BF_4^-$, $PF_6^-$, $B(Ph)_4^-$, $ClO_4^-$, methanesulfonate, trifluoromethanesulfonate, p-toluenesulfonate, halogenated alkyl-sulfonates, non-halogenated alkyl-sulfonates, acetate, trifluoroacetate, trichloroacetate, halogenated alkyl-carboxylates, non-halogenated carboxylates, citrate, phenolate, phenolate dertivates, benzenediolate, benzenediolate derivatives, benzenetriolate, benzenetetrolate derivatives, benzenepentolate, benzenepentolate derivatives, benzenehexolate, and benzenehexolate derivatives.

7. The process according to claim 1, wherein the anolyte and catholyte are different and one of the anolyte and catholyte is a nonaqueous liquid selected from the group consisting of: dimethylsulfoxide, ethyl methyl sulfone, sulfolane, acetonitrile, nitromethane, nitroethane, dimethylformamide, dimethoxyethane, 3-pentanone, 2-butanone, N-methylpyrrolidone, tert-butyl alcohol, ethylene carbonate, dimethylcarbonate, and propylene carbonate.

8. A process for delivering electrical power from a redox flow battery to an electrical circuit that includes an electric load, wherein the process comprises:
    selecting both a catholyte and an anolyte that each have electrochemical activity and an ion-forming supporting electrolyte wherein the catholyte and anolyte are immiscible one to the other;
    filling a power cell with the catholyte and anolyte to immiscibly coexist within the power cell and be immiscible at a liquid-liquid interface but allow certain ions to move freely back and forth across the liquid-liquid interface;
    directing anolyte from an anolyte storage tank to the power cell where the anolyte is disposed within the power cell while a corresponding volume of the anolyte in the power cell is directed out of the power cell;
    directing catholyte from a catholyte storage tank to the power cell where the catholyte is disposed within the power cell while a corresponding volume of the catholyte in the power cell is directed out of the power cell; and
    producing electrical power by the oxidation of the electrochemical constituent of the anolyte and the reduction of the electrochemical constituent of the catholyte while electrons flow from the anolyte through the electrical circuit and the certain ions move from the anolyte to catholyte across the liquid-liquid interface and there is no ion exchange resin within the redox flow battery separating the anolyte and catholyte, wherein the step of selecting the anolyte and catholyte further includes selecting the anolyte and catholyte to have a conductivity to be at least 1 S·cm$^2$/mol.

9. The process of claim 8 wherein the step of selecting the anolyte and catholyte further includes selecting the anolyte and catholyte to have ligand binding constant between ligands and metals to be between $10^{10}$ and $10^{40}$.

10. The process according to claim 9, wherein the step of selecting the anolyte and catholyte further includes selecting the anolyte and catholyte to be chemically immiscible and are selected from the group consisting of: aqueous brine, alkyl sulfoxides, alkyl sulfones, cyanoalkanes, nitroalkanes, amides, ethers, ketones, pyrrolidones, alcohols, and alkyl carbonates.

11. The process according to claim 10, wherein the step of selecting the anolyte and catholyte further includes selecting one of the anolyte and catholyte to be an aqueous brine comprising water, and at least 0.5 moles/liter ionic strength of electrochemically inactive cations and anions.

12. The process according to claim 11, wherein the step of selecting the cations further comprises selecting the cations from the group consisting of: $Li^+$, $Na^+$, $K^+$, $Rb^+$, $Mg^{2+}$, $Ca^{2+}$, $Sr^{2+}$, $Ba^{2+}$, $NH_4^+$, $N(CH_3)_4^+$, $N(C_2H_5)_4^+$, $N(C_3H_7)_4^+$, $N(C_4H_9)_4^+$, pyridiniums, imidazoliums, pyrrazoliums, other quaternary ammoniums and heterocyclic cations.

13. The process according to claim 11, wherein the step of selecting the anions further comprises selecting the anions from the group consisting of: $F^-$, $Cl^-$, $NO_3^-$, $SO_4^{2-}$, $PO_4^{3-}$, $HPO_4^{2-}$, $H_2PO_4^-$, $CO_3^{2-}$, $CN^-$, $BF_4^-$, $PF_6^-$, $B(Ph)_4^-$, $ClO_4^-$, methanesulfonate, trifluoromethanesulfonate, p-toluenesulfonate, halogenated alkyl-sulfonates, non-halogenated alkyl-sulfonates, acetate, trifluoroacetate, trichloroacetate, halogenated alkyl-carboxylates, non-halogenated carboxylates, citrate, phenolate, phenolate dertivates, benzenediolate, benzenediolate derivatives, benzenetriolate, benzenetetrolate derivatives, benzenepentolate, benzenepentolate derivatives, benzenehexolate, and benzenehexolate derivatives.

14. The process according to claim 11, wherein the anolyte and catholyte are different and one of the anolyte and catholyte is a nonaqueous liquid selected from the group consisting of: dimethylsulfoxide, ethyl methyl sulfone, sulfolane, acetonitrile, nitromethane, nitroethane, dimethylformamide, dimethoxyethane, 3-pentanone, 2-butanone, N-methylpyrrolidone, tert-butyl alcohol, ethylene carbonate, dimethylcarbonate, and propylene carbonate.

* * * * *